United States Patent [19]
Steele

[11] Patent Number: 6,030,152
[45] Date of Patent: Feb. 29, 2000

[54] PNEUMATIC SWITCH WITH REPOSITIONABLE CONDUITS

[75] Inventor: James R. Steele, Stillwater, Minn.

[73] Assignee: Dynamic Air, Inc., St. Paul, Minn.

[21] Appl. No.: 09/004,423

[22] Filed: Jan. 8, 1998

[51] Int. Cl.[7] .................................................. B65G 51/24
[52] U.S. Cl. ........................................... 406/182; 406/195
[58] Field of Search .................................... 406/181, 182, 406/193, 195

[56] References Cited

U.S. PATENT DOCUMENTS

| 4,252,479 | 2/1981 | Scherfenberg | 406/182 |
|---|---|---|---|
| 4,264,244 | 4/1981 | Steele | 406/182 |

FOREIGN PATENT DOCUMENTS

| 2535287 | 2/1977 | Germany | 406/182 |

Primary Examiner—Kenneth W. Noland

[57] ABSTRACT

A pneumatic switch having a wiper seal to inhibit material from escaping from a pneumatic conveying line during a switching process and to maintain the pneumatic conveying line in a closed condition to prevent contamination of the contents of the pneumatic conveying line and an inflatable seal to seal around a pneumatic conveying line with the pneumatic switch including a movable housing that is moveable with respect to a second pneumatic conveying line. The movable housing bearing is carried by a movable plate that allows one to position or reposition the pneumatic conveying line with respect to another conveying line to thereby divert material from one conveying line to another conveying line while an inflatable seal allows one to seal and reseal around the pneumatic conveying line. A drive mechanism with preset stops allows one to position or reposition the pneumatic conveying lines with respect to one another and a pneumatic bearing purge system inhibits the pneumatic switch from being jammed during the switching process.

21 Claims, 6 Drawing Sheets

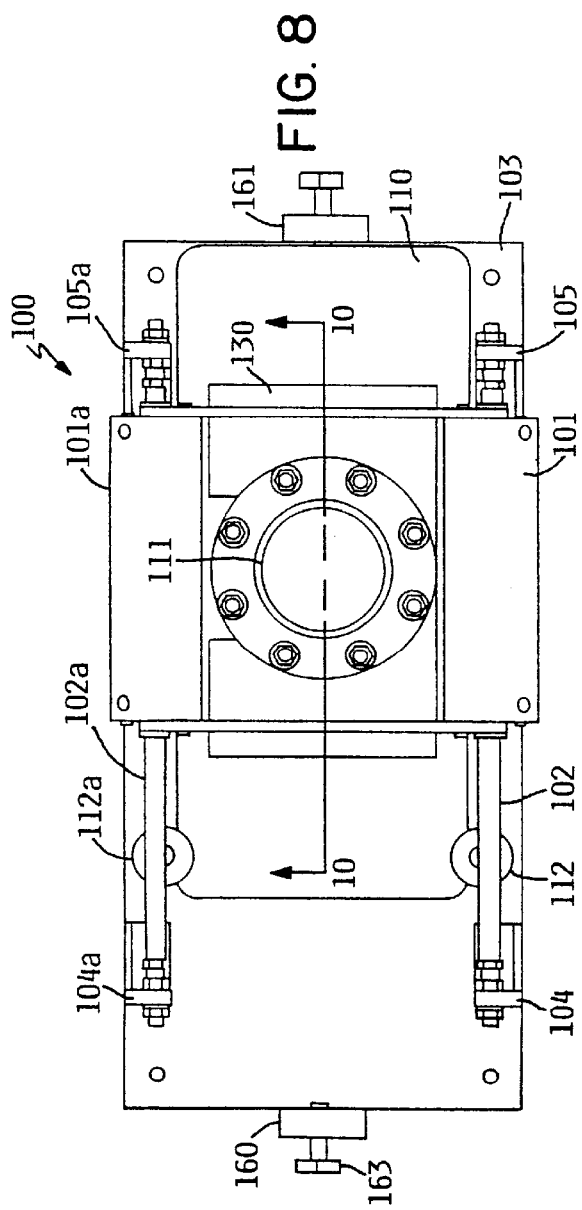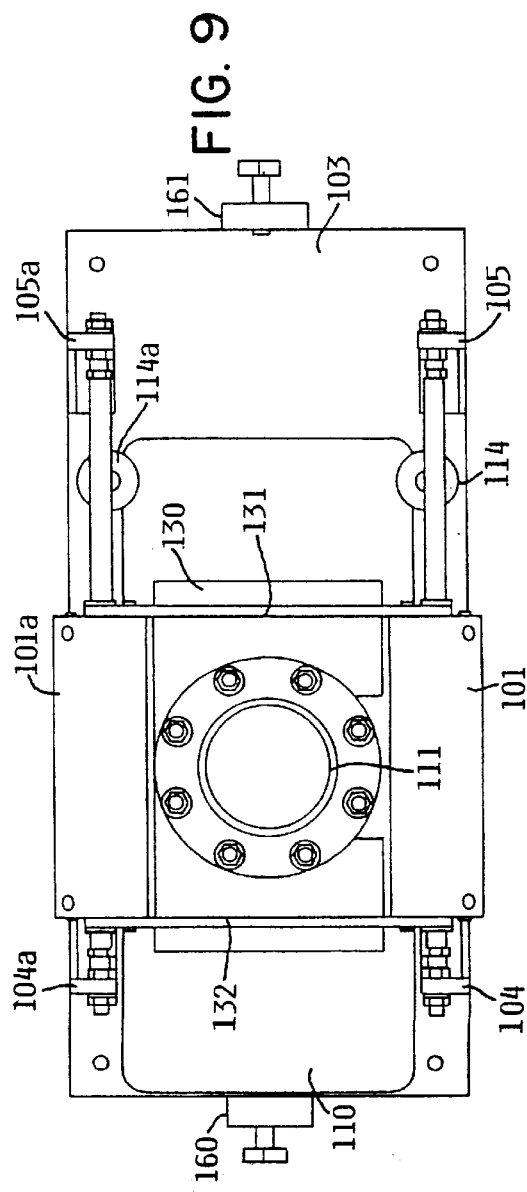

PNEUMATIC SWITCH WITH REPOSITIONABLE CONDUITS

FIELD OF THE INVENTION

This invention relates generally to pneumatic conveying systems and, more particularly, to improvements in switches for pneumatic conveying systems.

BACKGROUND OF THE INVENTION

In pneumatic conveying lines, granular or nongranular material is transported from one location to another. Often times, at selected intervals, it is necessary to divert the conveyed material into bins or onto another pneumatic conveying line. To switch or divert the material from one pneumatic conveying line to another pneumatic conveying line requires a pneumatic switch. One of the requirements of the pneumatic switch is that the pneumatic switch must be able to seal or reseal the pneumatic conveying lines when the material being transferred is directed from one pneumatic conveying line to another pneumatic conveying line. Not only does the switch need to effectively seal or reseal the pneumatic conveying lines, but the switch needs to remain free of contaminants that might affect the operation of the switch or contaminate the conveying lines. In addition, the pneumatic conveying lines which are switched must be repositioned in such a way such as not to bend or kink the pneumatic conveying lines, thus impeding the flow of materials therein.

DESCRIPTION OF THE PRIOR ART

U.S. Pat. No. 4,252,479 discloses a rotary pneumatic switch where the seal is provided by a pair of annular inflatable seals that facilitate sealing on both ends of a pneumatic conveying tube.

U.S. Pat. No. 4,264,244 discloses rotary diverter valves with interchangeable inlet and outlet passages with an annular seal that mates to a curved surface.

SUMMARY OF THE INVENTION

Briefly, the present invention comprises a pneumatic switch having a wiper seal to inhibit material from escaping from a pneumatic conveying line during a switching process, and to maintain the pneumatic conveying line in a closed condition to prevent contamination of the contents of the pneumatic conveying line. In one embodiment, a rotateable housing that is rotateable with respect to the axis of a pneumatic conveying line prevents twisting of the pneumatic conveying line. The rotateable housing is carried by a rotateable plate that allows one to position or reposition the pneumatic conveying line with respect to another conveying line to thereby divert material from one pneumatic conveying line to another pneumatic conveying line. In another embodiment, a slideable plate allows one to position or reposition the pneumatic conveying line with respect to another conveying line to thereby divert material from one pneumatic conveying line to another pneumatic conveying line. The pneumatic switch includes a wiper seal, an inflatable seal to seal or reseal around the pneumatic conveying line, a drive for positioning or repositioning the pneumatic conveying lines with respect to one another, and a pneumatic bearing purge system to inhibit the pneumatic rotary switch from being jammed during the switching process.

BRIEF DESCRIPTION OF THE DRAWINGS

FIG. 8 is top view showing the slide pneumatic conveying switch in a first condition;

FIG. 9 is top view showing the slide pneumatic conveying switch in a second condition.

DESCRIPTION OF THE PREFERRED EMBODIMENT

Figure 1:
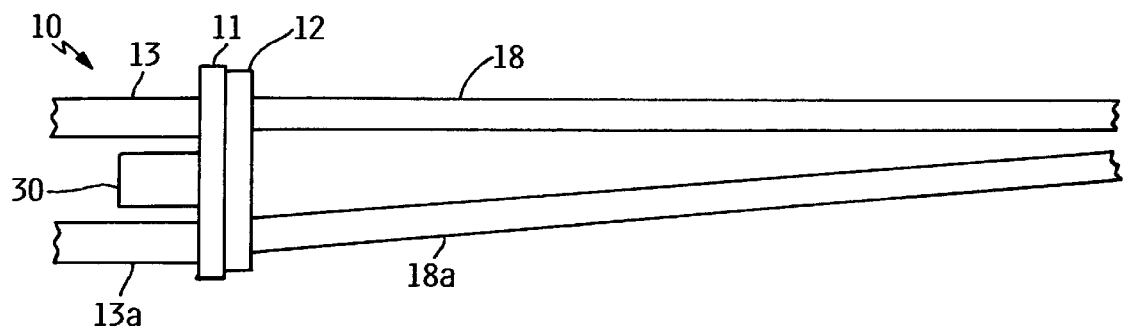
FIG. 1 is a front schematic view of a rotary pneumatic switch and conveying conduits in a first condition.

FIG. 1 shows a front view of a pneumatic switch 10 for a pneumatic conveying system. Switch 10 includes a first plate 11 which carries a first inlet conduit 13 and a second inlet conduit 13a. A second plate 12, which is rotateably mounted and driven by a drive 30 which is located in an abutting and bolt-secured relationship with first plate 11, carries a first flexible conduit 18 and a second flexible conduit 18a. In the condition shown in FIG. 1, second inlet conduit 13a and second flexible conduit 18a are in fluid communication with one another and first inlet conduit 13 and first flexible conduit 18 are also in fluid communication with one another. In the operation of the conveying system shown in FIG. 1, material flows through first inlet conduit 13, first plate 11, second plate 12 and into first flexible conduit 18 while material also flows through second inlet conduit 13a, first plate 11, second plate 12 and into second flexible conduit 18a.

Figure 2:
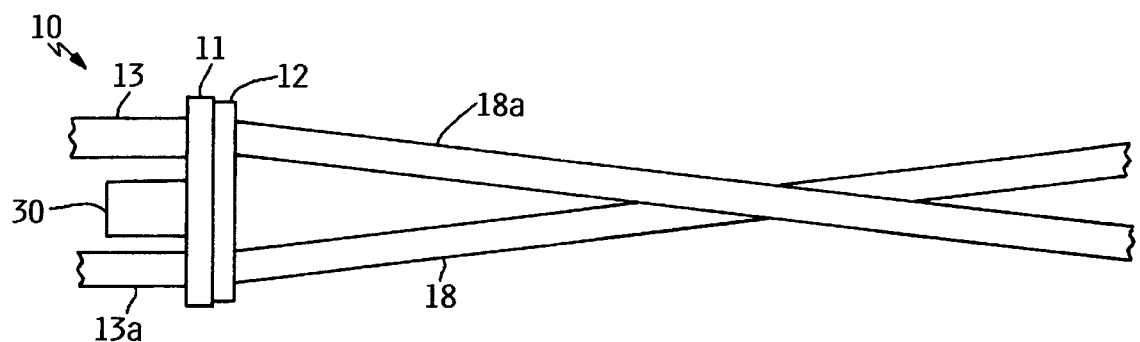
FIG. 2 is a front schematic view of the rotary pneumatic switch and conveying conduits of FIG. 1 in a second condition.

To illustrate how pneumatic switch 10 can be used as a crossover switch to change the delivery path of materials, reference should be made to FIG. 2, which shows that second plate 12 has been rotated 180 degrees by drive 30 so that second flexible conduit 18a is now in fluid communication with first inlet conduit 13, and first flexible conduit 18 is now in fluid communication with second inlet conduit 13a. That is, the drive 30 rotates second plate 12 so that the first and second flexible conduits 18 and 18a are switched from the conveying condition shown in FIG. 1 to the conveying condition shown in FIG. 2. The embodiment shown in FIG. 1 and FIG. 2 illustrates that two conveying lines can be interchanged with one another. To illustrate how two conveying lines can be interchanged with one another while preventing contamination of the system, as well as maintaining the system in trouble-free operation, reference should be made to FIG. 3.

Figure 3:
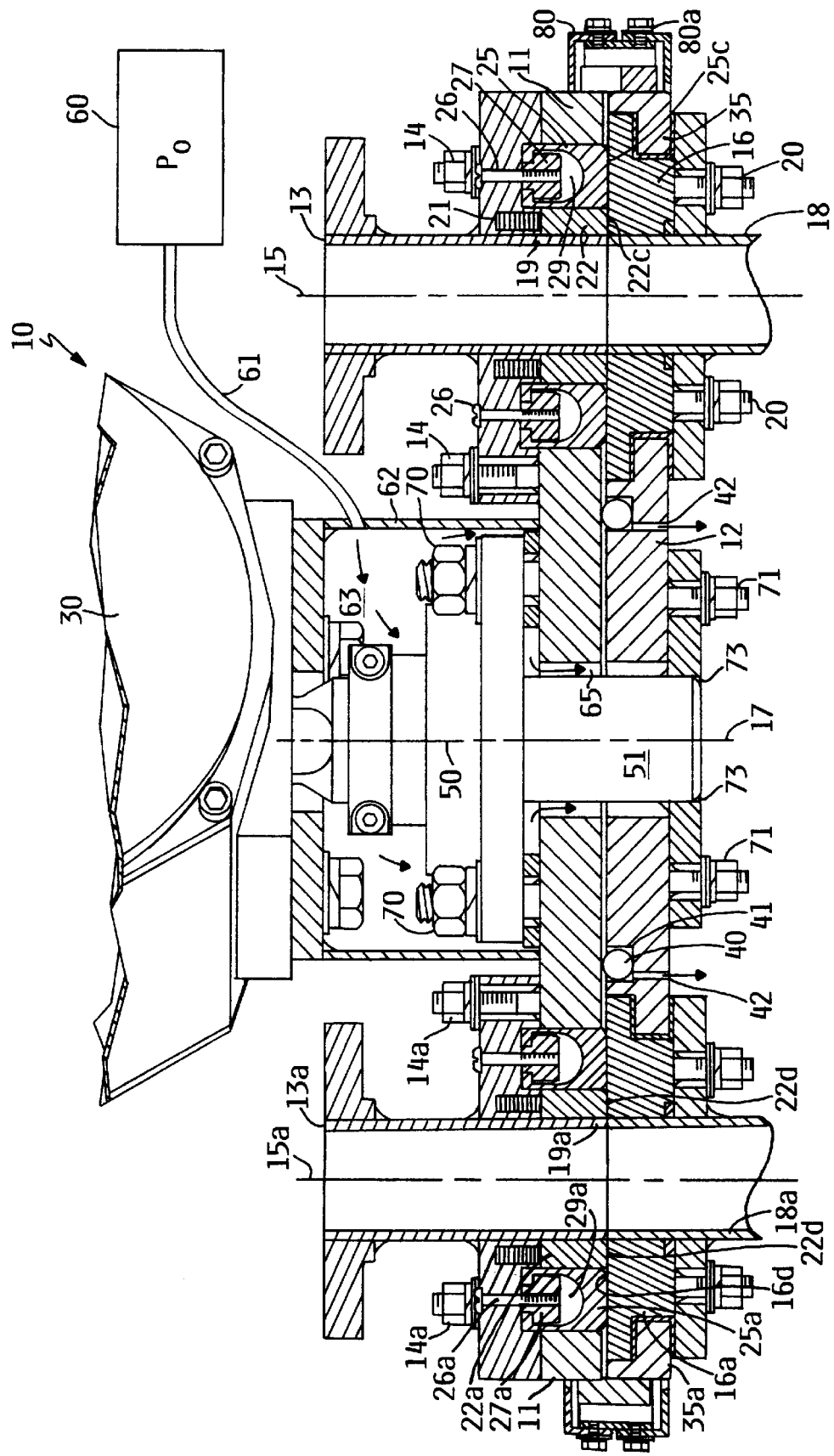
FIG. 3 is a sectional view of rotary pneumatic switch.

FIG. 3 shows a partial cross-sectional view of pneumatic switch 10 for a pneumatic conveying system, with the pneumatic switch 10 in the first conveying condition illustrated in FIG. 1. Pneumatic switch 10 includes a first plate 11 having a central axis 17, and a second plate 12 rotateable about central axis 17. Located in a fixed condition in first plate 11 is a first inlet conduit 13 for pneumatically conveying materials therethrough, with the first inlet conduit 13 having a first end 19 secured to first plate 11 by bolts 14.

First inlet conduit 13 has a first conduit axis 15. Similarly, located in a fixed condition in first plate 11 is a second inlet conduit 13a for pneumatically conveying materials therethrough, with the second inlet conduit 13a having a first end 19a secured to first plate 11 by bolts 14a. Second inlet conduit 13a has a second conduit axis 15a.

Located circumferentially around first inlet conduit 13 is a first set of springs 21 that engage a wear band 22 to form a spring-loaded wear band or annular wiper seal that maintains continuous contact between a wear band annular surface 22c and either second plate 12, or a surface 16c on a first housing 16 which is fastened to conduit 18 through bolts 20. In operation, wear band 22 remains in contact with either first housing 16 or second plate 12 to thereby inhibit materials within first inlet conduit 13 from passing rapidly outward of first inlet conduit 13 when second plate 12 with first housing 16 is rotated about central axis 17, as well as to maintain the system in a closed condition to avoid contamination of materials within the pneumatically conveyed lines.

Located circumferentially around first inlet conduit 13 and wear band 22, is a first annular inflatable seal 25 that is held in position by bolts 26 and fastener 27. First annular inflatable seal 25 contains an annular chamber 29 that can be pressurized which causes an annular surface 25c of first annular inflatable seal 25 to engage housing surface 16c in a tight-sealing relationship to thereby prevent discharge of material radially outward from the junction between conduits 18 and 13 during operation of the pneumatic switch 10 in the conveying mode. First annular inflatable seal 25 can be engaged or disengaged by pressurization or depressurization of annular chamber 29. In the depressurized or uninflated condition, first annular inflatable seal 25 is free of and spaced from housing surface 16c to permit rotation of second plate 12 about central axis 17. While wear band 22 maintains continuous contact between wear band annular surface 22c and either second plate 12 or housing surface 16c, the frictional engagement forces are sufficiently low so as to permit sliding of wear band 22 thereover so that second plate 12 can be rotated with respect to first plate 11, while the wear band 22 is engaged therewith.

Similarly, located circumferentially around second inlet conduit 13a and wear band 22a, is a second annular inflatable seal 25a that is held in position by bolts 26a and fastener 27a. Second annular inflatable seal 25a contains an annular chamber 29a that can be pressurized which causes an annular surface 25d of second annular inflatable seal 25a to engage housing surface 16d in a sealing relationship to thereby prevent discharge of material radially outward from the junction between second flexible conduit 18a and first end of second inlet conduit 19a during operation of the pneumatic switch 10 in the conveying mode. Second annular inflatable seal 25a can be engaged or disengaged by pressurization or depressurization of annular chamber 29a. In the depressurized or uninflated condition, second annular inflatable seal 25a is free of and spaced from housing surface 16d to permit rotation of second plate 12 about central axis 17. Similarly, while wear band 22a maintains continuous contact between wear band annular surface 22d and either second plate 12 or housing surface 16d, the frictional engagement forces are sufficiently low so as to permit sliding of wear band 22a thereover so that second plate 12 can be rotated with respect to first plate 11 while the wear band or wiper seal 22a is engaged therewith.

FIG. 3 shows that first housing 16 which carries first flexible conduit 18 is rotateably mounted in second plate 12 to permit rotation of first flexible conduit 18 about axis 15.

Located between first housing 16 and second plate 12 is an annular layer of bearing material 35. Bearing material 35 provides a low friction rotateable support between first housing 16 and second plate 12 with the frictional relationship between first housing 16 and second plate 12 such that the torsional resistance forces about axis 15 are sufficiently weak to allow for rotation of first housing 16 with respect to first flexible conduit 18 when first flexible conduit 18 is rotated from the first conveying condition in FIG. 1 to the second conveying condition in FIG. 2. That is, the integrity of the first flexible conduit 18 has sufficient stiffness so that the first flexible conduit 18 will maintain itself in an untwisted condition even though the first flexible conduit 18 will be directed to a second position which is remote from the first position.

Similarly, second housing 16a is rotateably mounted in second plate 12 to permit rotation of second flexible conduit 18a about axis 15a. Located between second housing 16a and second plate 12 is a second annular layer of bearing material 35a. Bearing material 35a provides a low friction rotateable support between second housing 16a and second plate 12, with the frictional relationship between second housing 16a and second plate 12 such that the torsional resistance forces about axis 15a are sufficiently weak to allow for rotating of second housing 16a with respect to second flexible conduit 18a, when second flexible conduit 18a is rotated from the first conveying condition in FIG. 1 to the second conveying condition in FIG. 2. That is, the integrity of the second flexible conduit 18a, like first flexible conduit 18, has sufficient stiffness so that the second flexible conduit 18a will maintain itself in an untwisted condition even though the second flexible conduit 18a will be directed to a second position, as shown in FIG. 2, which is remote from the first position, which is shown in FIG. 1.

A feature of the present invention is that the first and second flexible conduits 18 and 18a can be rotated 180 degrees without kinking or bending of the conduits which would impede material flow, as both first and second flexible conduits 18 and 18a can maintain their orientation, because the annular layers of bearing material 35 and 35a provide sufficiently low torsion frictional resistance so that the stiffness of the flexible conveying conduit 18 and 18a can overcome the frictional forces that inhibit housing 16 or surface of housing 16c from rotating to thereby maintain the first and second flexible conduits 18 and 18a in an untwisted, conveying condition.

In order to provide rotation of second plate 12 with respect to first plate 11, there is provided a set of ball bearings 40 mounted in an annular race 41. A set of vent holes extend outward from annular race 41. FIG. 3 shows that ball bearings 40 rotateably support second plate 12 with respect to first plate 11 with the rotation therebetween provided by drive 30 which is secured to first plate 11 by bolts 70.

The mechanism for rotation of second plate 12 with respect to first plate 11 includes a drive housing 50 which has one end fixedly connected to drive 30, and the other end fixedly connected to first plate 11. Extending from drive housing 50 is a rotateable drive shaft 51 which is fixedly attached to second plate 12, but rotateable with respect to drive housing 50. That is, welds 73 and bolts 71 fixedly secure second plate 12 to rotateable drive shaft 51. In operation of pneumatic switch 10, one activates drive 30, which rotates drive shaft 51 about central axis 17, which in turn causes second plate 12 to rotate with respect to first plate 11. In the embodiment shown, the rotation of second plate 12 by 180 degrees will interchange the position of the first and second flexible conduits 18 and 18*a* causing first flexible conduit 18 to be located in the position previously held by second flexible conduit 18*a,* and second flexible conduit 18*a* to be located in the position previously held by first flexible conduit 18.

One of the features of my invention is that I can maintain the ball bearings 40 and annular race 41 in a clean, jam-free condition even though material being transported within the conveying system could cause the ball bearings 40 to jam within annular race 41. To maintain the ball bearings 40 in a freely rotateable condition, I provide a pneumatic bearing purge system including a source of pressurized air or gas 60 that connects to a housing 62 through a tubing 61. During operation of the pneumatic switch 10, high pressure air $P_o$ flows from source 60 through tubing 61 and into a chamber 63 where it flows into annular chamber 65 around shaft 51. The arrows indicate the air then flows radially outward between first plate 11 and second plate 12, thereby filling the space therebetween as well as vents 42 with pressurized air $P_o$. The outward flow of air prevents any particulate matter from entering into the ball bearings 40 and annular race 41, thereby ensuring that the ball bearing 40 will continue to function cleanly to rotateably support second plate 12 with respect to first plate 11.

To appreciate the operation of pneumatic switch 10 as one conveying line is interchanged with another, reference should be made to FIG. 3. To begin the switch operation, the pneumatic purging system is activated to direct pressurized air through ball bearings 40 to ensure that second plate 12 can be rotated cleanly with respect to first plate 11. The annular inflatable seals 25 and 25*a* are deflated to remove the frictional sealing relationship between first annular inflatable seal 25 and first housing 16, and second annular inflatable seal 25*a* and second housing 16*a*. This frees the housings 16 and 16*a* to rotate within there respective annular bearings. Next, one actives drive 30 to rotate rotateable drive shaft 51 and second plate 12 by 180 degrees to cause first flexible conduit 18 which was in fluid communication with first inlet conduit 13 as shown in FIG. 1 to become in fluid communication with second inlet conduit 13*a*. Similarly, second flexible conduit 18*a* which was in fluid communication with second inlet conduit 13*a* is now in fluid communication with first inlet conduit 13. Note that during the rotation phase, the wear band annular surfaces 22*c* and 22*d* maintain contact with either the housings or the second plate 12 to maintain the integrity of the conveying lines by ensuring that the conveying lines remain in a closed condition with respect to the environment outside the pneumatic switch. After the conduits are rotated in alignment with one another, the annular inflatable seals 25 and 25*a* are reinflated to seal the conduits in fluid communication with one another. The pressurized air to chamber 63 can now be shut off as the inflatable seals prevent any particulate materials from escaping from the conduits.

Figure 4:
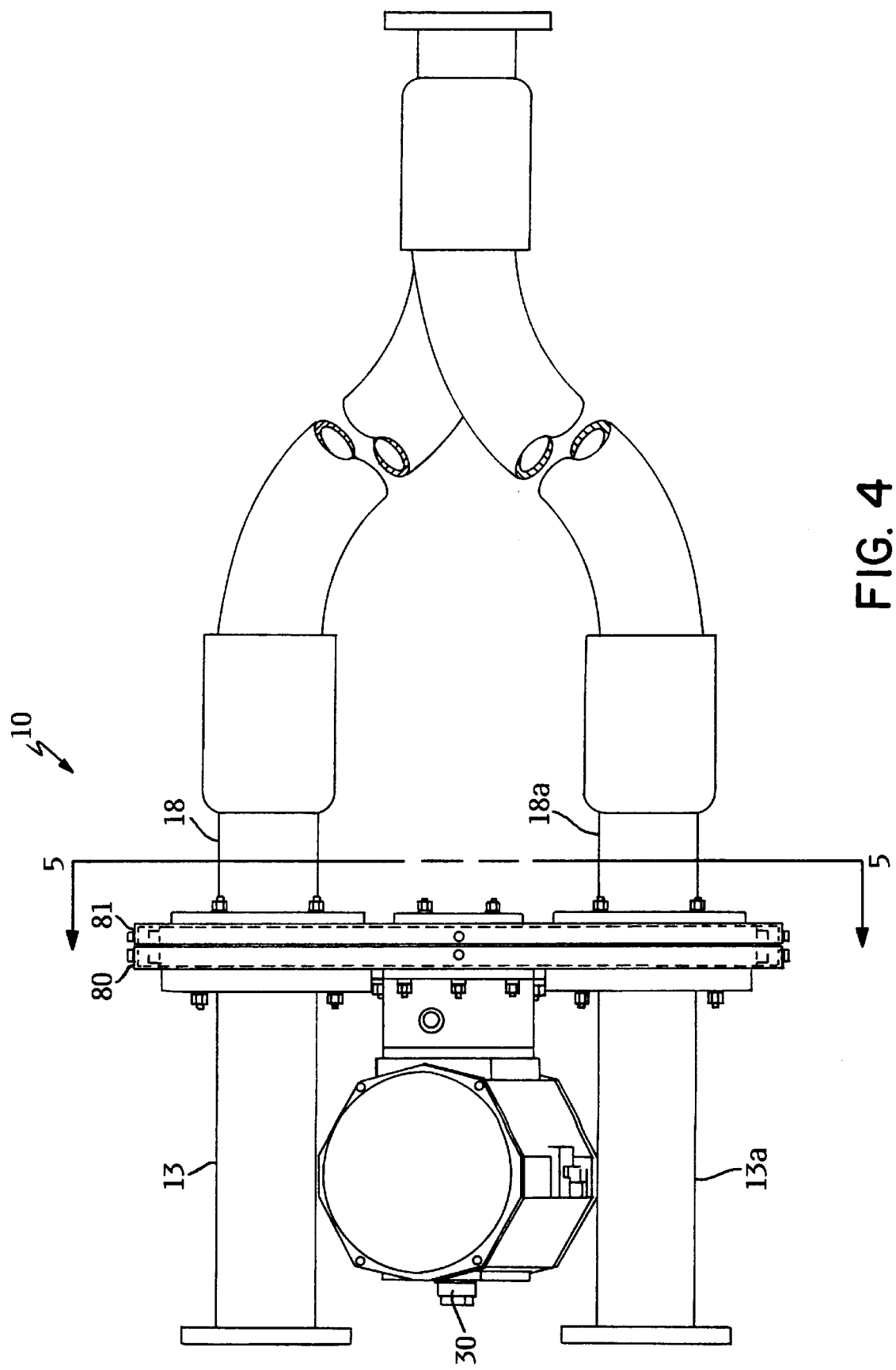
FIG. 4 is a side view of a rotary pneumatic switch with a rotary drive mechanism.
Figure 5:
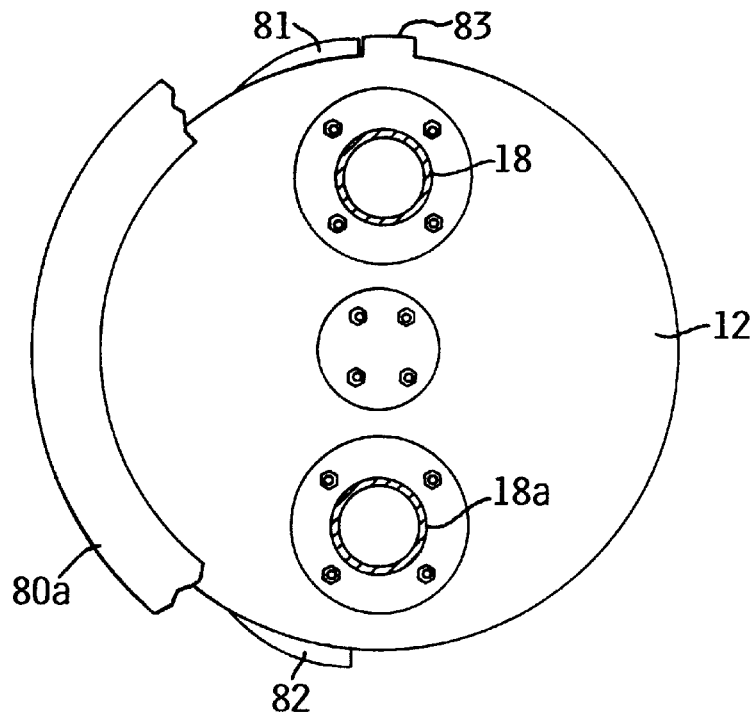
FIG. 5 is a sectional view taken along line 5—5 of FIG. 4 showing the rotary pneumatic switch in a first condition.
Figure 6:
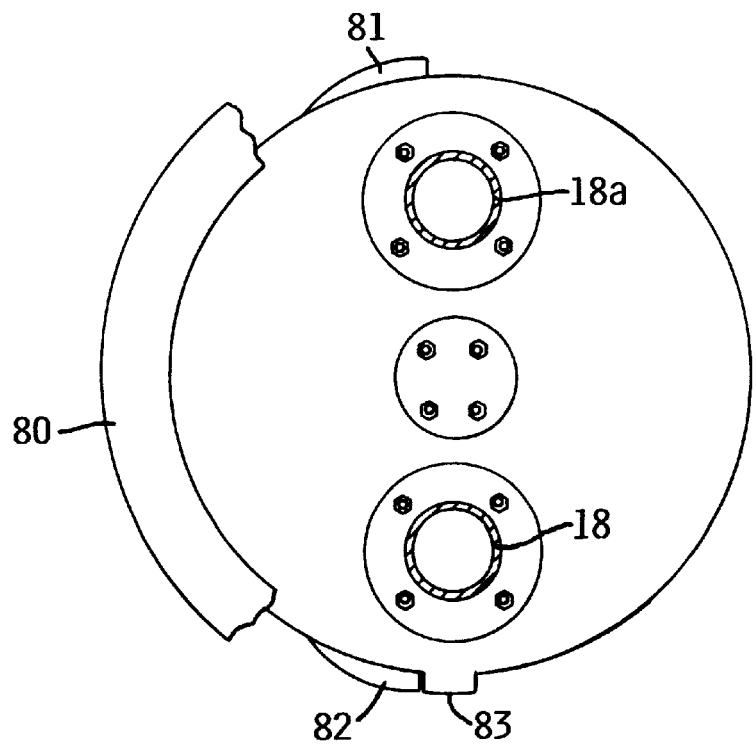
FIG. 6 is a sectional view taken along line 5—5 of FIG. 4 showing the rotary pneumatic switch in a second condition.

To understand the rotation of rotary switch 10, reference should be made to FIGS. 4 through 6. FIG. 4 shows a side view of the rotary switch 10 with an outer round shield 80 and 80*a* located thereon to form a protective housing for rotation of a stop therein.

FIG. 5 shows a partial cross sectional and cutaway view showing a first fixed stop 81 and a second fixed stop 82 which are affixed to plate 11. A radial extension 83 is shown extending radially outward from plate 12 with FIG. 5 showing extension 83 in a first condition abutting against stop 81. In this condition, the conduits 18 and 18*a* are in alignment with conduits on the opposite side of plate 12, as shown in FIG. 1.

FIG. 6 shows the partial cross sectional and cutaway view of FIG. 5 showing stop 81 and stop 82 which are affixed to plate 11. An extension 83 is shown extending radially outward from plate 12 showing extension 83 in a second condition abutting against second stop 82. In this condition, the conduits 18 and 18*a* are in alignment with conduits on the opposite side of plate 12; however, the conduits have been rotated 180° to enable the conduits to be realigned with the input conduits as shown in FIG. 2.

Shield 80*a* is provided so that radial extension 83 which moves from one position to another position will not accidentally injure anyone as it does so.

Figure 7:
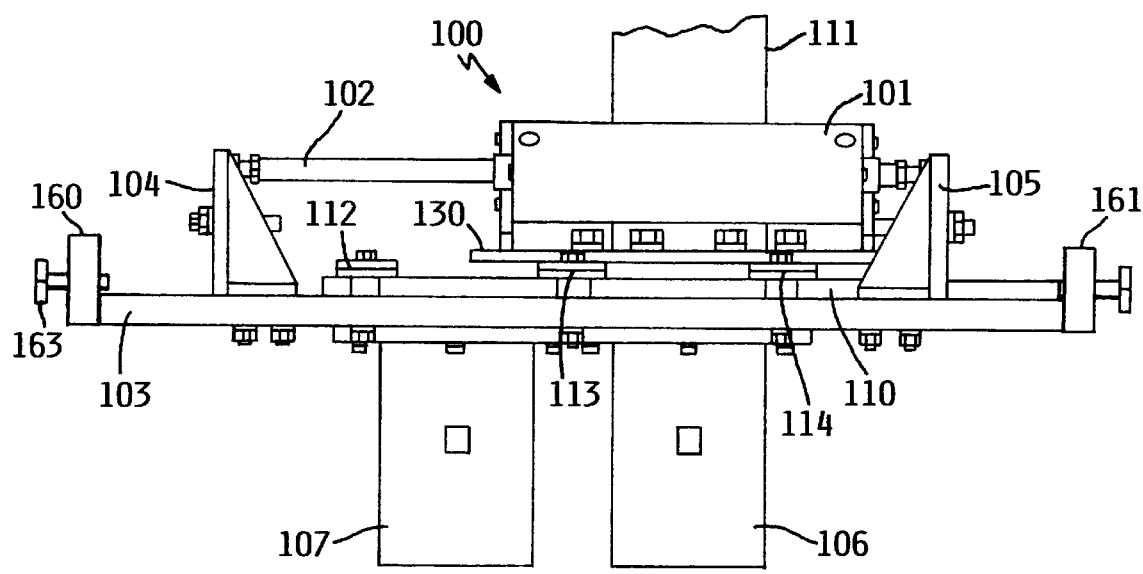
FIG. 7 is a side view of a slide pneumatic conveying switch.

Referring to FIGS. 7 through 9, an alternate embodiment of my invention which comprises a slide switch 100 for sliding a conveying tube into alignment and out of alignment with another conveying tube. Pneumatic slide switch 100 includes a first conduit tube 111 which is carried by a slideable plate 130 that is slideably held on housing 103. Attached to the underside of housing 103 is a first conveying tube 106 and a second conveying tube 107. The pneumatic slide switch is movable between a first conveying position shown in FIG. 8 to a second conveying condition shown in FIG. 9. In the conveying position shown in FIG. 8 and FIG. 7 the first conduit 111 is in fluid alignment with the first conveying tube 106.

In order to move first conduit 111 from one conveying condition to another conveying condition, there is provided an elongated plate 110 that is slideably supported on opposite edges by opposed rollers 112, 112*a,* rollers 113 and an opposed roller (not shown) and opposed rollers 114 and 114*a*. Located on slide plate 110 is a support plate 130 that connects to linear actuators 101 and 101*a* through members 131 and 132. A set of brackets 104 and 104*a* support one end of actuator rod 102 which is retractable and extendible with respect to actuator 101. Similarly, a set of brackets 105 and 105*a* support the opposite end of actuator rod 102*a* which is retractable and extendible with respect to actuator 102. That is the activation of actuator 101 and 101*a* will cause the plate 130 and plate 110 to move first conduit 111 from one condition to a second condition.

Figure 10:
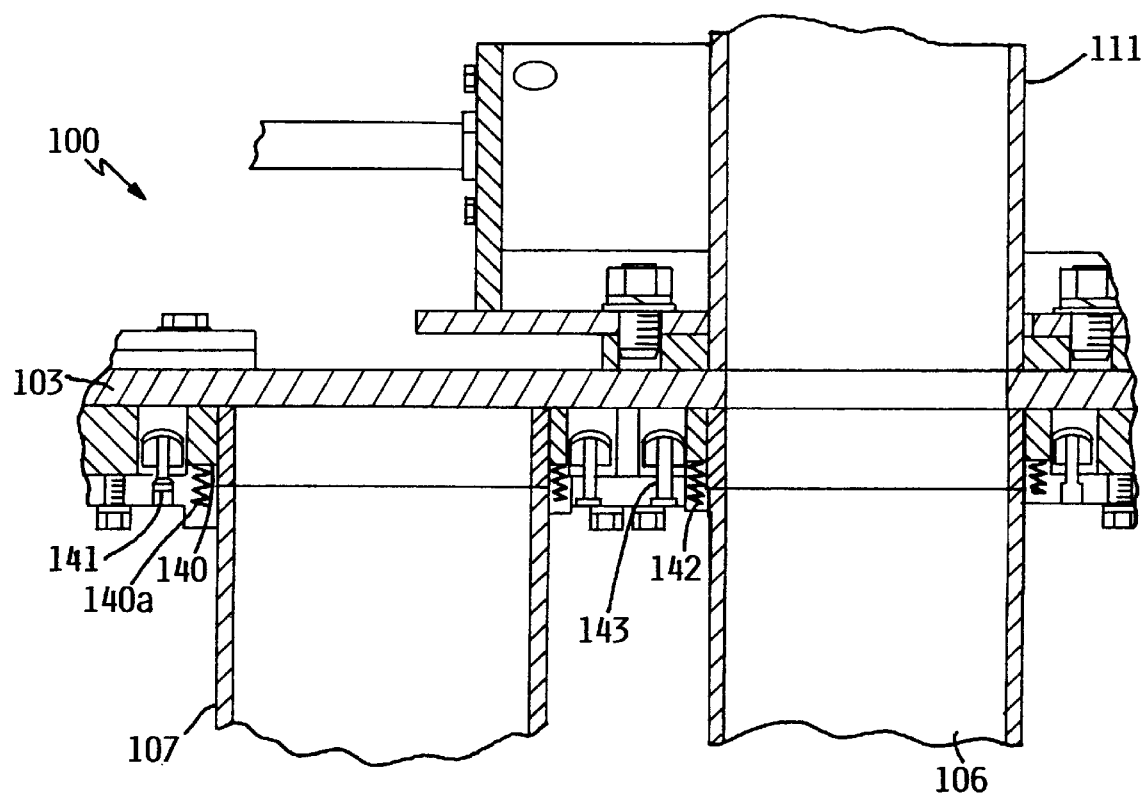
FIG. 10 is a sectional view showing the sealing and wiper members in the slide pneumatic switch.

The pneumatic slide switch sealing system 100 includes a sealing mechanism similar to the sealing mechanism of the rotary switch 10. FIG. 10 shows a partial cross-sectional view of the annular wiper seal 140 with a set of springs 140*a* for holding the wiper member 140 against plate 103. Wiper seal 140 extends along second conveying tube 107 and is held in pressure contact with plate 103 by springs 140*a* to prevent contaminants from entering second conveying tube 107. An annular inflatable seal 141 is located around second conveying tube 107 to seal around the conduit.

FIG. 10 also shows a cross-sectional view of annular wiper seal 142 with spring 142*a* for holding the wiper member 142 against plate 110. Wiper seal 142 extends along first conveying tube 106 and is held in pressure contact with plate 103 to prevent contaminants from entering first conveying tube 106. Similarly, an annular inflatable seal 143 is located around first conveying tube 106 to seal first conveying tube 106 to plate 103.

Located on end of housing 103 is a first stop 160, and similarly located on the other end of housing 103 is a second stop 161. The purpose of stops 160 and 161 is to permit an operator to adjust the distance plate 110 travels so that one can properly align the conveying lines. Stop 160 includes a threaded recess therein and a bolt 163 for securing therein. Bolt 163 can be adjusted to control the stop point of plate 103, and consequently, the alignment of the conduits and conveying tube as well.

While the invention has been described with respect to two conveying lines, once my system is known, it is apparent that the system can be used with a single conveying line or multiple conveying lines.

Thus, in operation of my slide switch 100, the housing slideable plate 103 can maintain conduit 111 and conveying tube in alignment as shown in FIGS. 8 and 10. To switch the unit from conveying tube 106 to 107, inflateable seal 143 is deflated and linear actuators 101 and 101a are activated to move plate 103 and conduit 111 from the position shown in FIG. 8 to the position shown in FIG. 9. In the position shown in FIG. 9, conduit 111 is in fluid connection with conveying tube 107. Once the conduit 111 and conveying tube 107 are in alignment, the annular inflatable seal 140 is inflated to form a leak proof seal around conveying tube 107.

I claim:

1. A switch for a pneumatic conveying system comprising:

a first plate, said first plate having a central axis;

a first conduit for pneumatic conveying materials therethrough, said first conduit having a first end secured to said plate, said first conduit having a first conduit axis;

a second conduit for pneumatic conveying materials therethrough, said second conduit having a first end secured to said plate, said second conduit having a second conduit axis;

a second plate, said second plate rotateable about said central axis of said first plate;

a first housing including a third conduit for pneumatically conveying materials therethrough, said first housing rotateably supported in said second plate to permit turning of said third conduit with respect to said second plate without twisting of said third conduit;

a second housing including a fourth conduit for pneumatically conveying materials therethrough, said fourth housing rotateably supported in said second plate to permit turning of said fourth conduit with respect to said second plate without twisting of said fourth conduit;

a first spring-loaded wear band located around said first conduit to maintain continuous contact between either said second plate or said first housing to inhibit materials from being accidentally discharged therefrom, said first spring-loaded wear band having sufficiently low frictional engagement with either said first housing or said first plate so as to permit sliding engagement over either said first housing or said first plate;

a second spring-loaded wear band located around said second conduit to maintain continuous contact between either said second plate or said second housing to inhibit materials from being accidentally discharged therefrom, said second spring-loaded wear band having sufficiently low frictional engagement with either said second housing or said first plate so as to permit sliding engagement over either said first housing or said first plate;

a first inflatable seal located around said first conduit, said first inflatable seal inflatable to a condition to thereby prevent material passing from discharging therepast;

a second inflatable seal located around said second conduit said second inflatable seal inflatable to a condition to thereby prevent material passing from discharging therepast;

said first and second inflatable seals deflateable to permit conduit switch by rotation of said second plate about said central axis to thereby bring said first conduit from a conveying condition with said first housing to a conveying condition with said second housing and said second conduit from a conveying condition with said second housing to a conveying condition with said first housing.

2. The switch of claim 1 including a plate bearing for maintaining said first plate and said second plate in a rotateable condition with respect to each other.

3. The switch of claim 2 including a first housing bearing for supporting said first housing in said second plate.

4. The switch of claim 3 including a second housing bearing for supporting said second housing in said second plate.

5. The switch of claim 1 including a source of pressurized gas for directing pressurized gas through said plate bearing to prevent materials being conveyed by said conduits from accidentally contaminating the bearing.

6. The switch of claim 1 including a drive motor for rotating said second plate with respect to said first plate.

7. The switch of claim 1 wherein the inflatable seals are annular.

8. The switch of claim 1 wherein each of the inflatable seals are positioned radially upward of the respective wiper bands.

9. The switch of claim 5 where the plate bearing includes a vent for purging the bearing of materials that might inhibit the rotation of said first plate with respect to said second plate.

10. A switch for a pneumatic conveying system comprising:

a movable plate;

a conduit for pneumatic conveying materials therethrough, said conduit having a first end secured to said plate, said first conduit having a first conduit axis;

a housing, said housing moveable supporting said plate thereon, said plate positionable along said housing, said housing including a pneumatic conveying tube for pneumatically conveying materials therethrough, said movable plate movably supported on said housing to permit said conduit to be brought into fluid communication or out of fluid communication with said pneumatic conveying tube;

a wiper seal for maintaining sliding, but continuous contact with said plate to prevent contamination of the interior of the conveying tube; and an inflatable seal deflateable to a condition to permit sliding of said plate with respect to said housing, and inflatable to a condition to prevent material from escaping from said switch during normal operation of said conveying line and said conduit.

11. The switch of claim 10 including a linear actuator for moving said plate with respect to said housing.

12. The switch of claim 11 including a second conveying tube mounted on said housing with said second conveying.

13. The switch of claim 12 including a set of rollers for slideably holding said plate.

14. The switch of claim 13 including a stop.

15. A switch for a pneumatic conveying system comprising:

a first plate, said first plate having a central axis;

a conduit for pneumatic conveying materials therethrough, said conduit having a first end secured to said plate, said first conduit having a first conduit axis;

a second plate, said second plate rotateable about said central axis of said first plate;

a housing including a flexible pneumatic line for pneumatically conveying materials therethrough, said housing rotateably supported in said second plate to permit turning of said flexible pneumatic line with respect to said second plate to enable said flexible pneumatic line to be brought into fluid communication or out of fluid communication with said conduit;

a wiper seal for maintaining sliding, but continuous contact with either said second plate or said housing to prevent contamination of the interior of the conveying line during a switching;

a rotateable support maintainable in a rotateable condition to ensure that the first plate can be rotationally positioned or repositioned with respect to said second plate; and an inflatable seal deflateable to a condition to permit rotation of said first plate with respect to said second plate, and inflatable to a condition to prevent material from escaping from said conduit during normal operation of said conveying line and said conduit.

16. The switch of claim 15 including a plate bearing for maintaining said first plate and said second plate in a rotateable condition with respect to each other.

17. The switch of claim 16 including a first housing bearing for rotateably supporting said first housing in said second plate.

18. The switch of claim 17 including a source of pressurized gas for directing pressurized gas through said plate bearing to prevent materials being conveyed by said conduits from accidentally contaminating the bearing.

19. The switch of claim 18 including a drive motor for rotating said second plate with respect to said first plate.

20. The switch of claim 19 wherein the inflatable seal is annular and is positioned radially outward of the wiper band.

21. The switch of claim 20 including a drive shaft connecting the first and second plates, said drive shaft operable to rotate said second plate with respect to said first plate.

* * * * *